United States Patent

Hiruma

[15] 3,643,573
[45] Feb. 22, 1972

[54] EYE-LEVEL EYEPIECE SHIELDING DEVICE FOR EYE-LEVEL AND WAIST-LEVEL VIEWFINDER

[72] Inventor: Kenji Hiruma, Tokyo, Japan
[73] Assignee: Kabushiki Kaisha Ricoh, Tokyo, Japan
[22] Filed: Aug. 18, 1969
[21] Appl. No.: 850,711

[52] U.S. Cl. ................................................95/42, 95/11 V
[51] Int. Cl. ..............................................................G03b 19/12
[58] Field of Search ..........................................95/11 V, 42

[56] References Cited

UNITED STATES PATENTS

| 2,952,197 | 9/1960 | Goshima | 95/42 |
| 3,020,815 | 2/1962 | Landbrecht | 95/42 |

FOREIGN PATENTS OR APPLICATIONS

| 237,554 | 1/1962 | Austria | 95/42 |

Primary Examiner—John M. Horan
Assistant Examiner—Michael Harris
Attorney—Burgess, Ryan & Hicks

[57] ABSTRACT

An eye-level eyepiece shielding device for a camera in which a waist-level eyepiece is disposed upwardly of a final reflecting surface of a pentaroof-type reflecting mirror of a viewfinder optical system of a single-lens reflex camera, an eye-level eyepiece is disposed in the vicinity of a light exit of said pentaroof-type reflecting mirror, a planar reflecting mirror is disposed between the waist-level eyepiece and the final reflecting surface, and a shielding plate which can optionally shield and open the eye-level eyepiece is disposed forwardly of the eye-level eyepiece, the shielding plate being adapted to optically shield or open the eye-level eyepiece in response to the rotation of the planar reflecting mirror through a cam mechanism and a link mechanism so that when the waist-level eyepiece is used the external light through the eye-level eyepiece may be prevented from entering into the viewfinder optical system.

5 Claims, 2 Drawing Figures

EYE-LEVEL EYEPIECE SHIELDING DEVICE FOR EYE-LEVEL AND WAIST-LEVEL VIEWFINDER

BACKGROUND OF THE INVENTION

The present invention relates to a viewfinder of a camera and more particularly to an eye-level eyepiece shielding device of an eye-level and waist-level viewfinder of a camera.

In an eye-level and waist-level viewfinder, when the eye-level viewfinder is used, no external light enters into the viewfinder optical system from the waist-level eyepiece. But when the waist-level viewfinder or eyepiece is used, the external light emerging from the eye-level eyepiece into the viewfinder optical system is diffuse-reflected in the system and is directed toward the waist-level eyepiece. In this case, contrast of the image viewed through the viewfinder is worse and furthermore flares or ghosts of the image will be produced.

Therefore, the primary object of the present invention is to eliminate such defects described above by providing an eye-level eyepiece shielding device of the type in which the eye-level eyepiece may be automatically optically shielded in response to the changeover from the eye-level eyepiece to the waist-level eyepiece in an eye-level and waist-level viewfinder.

SUMMARY OF THE INVENTION

In brief, the present invention provides an eye-level and waist-level viewfinder in which a waist-level eyepiece is disposed upwardly of a final reflecting mirror of a pentaroof-type reflecting mirror of a viewfinder optical system of a single-lens reflex camera; an eye-level eyepiece is disposed in the vicinity of a light exit of the pentaroof-type reflecting mirror; a planar reflecting mirror is rotatably disposed between the waist-level eyepiece and the final reflecting surface in such a manner that when the planar reflecting mirror is at its retracted position, the light through a photo lens reaches an eye-level eyepiece through the roof-type reflecting surfaces of the pentaroof-type reflecting mirror and the final reflecting surface while when the planar reflecting mirror is at its reflecting position, the light reaches the waist-level eyepiece through the roof-type reflecting surfaces and the planar reflecting mirror.

According to the present invention, a cam having a higher stepped portion, a middle stepped portion and a lower stepped portion is disposed adjacent to one sidewall of the pentaroof-type reflecting mirror and a rotatable shielding plate is disposed to optically shield or open the eye-level eyepiece. A lever which is rotatable together with the planar reflecting mirror and a rotatable drive lever which is connected to the shielding plate through a lever mechanism are normally engaged with the cam. The cam is adapted to rotate to two or more than two positions which are angularly spaced apart from each other by a predetermined angle so that the planar reflecting mirror may be rotated to its retracted or reflecting position. When the planar reflecting mirror is at its retracted position, the shielding plate is optically opened while when the planar reflecting mirror is at its reflecting position, the shielding plate optically shields the eye-level eyepiece. Thus, it will be understood that when the waist-level eyepiece is used, the eye-level eyepiece is automatically optically shielded so that the undesired external light is prevented from entering into the viewfinder system, whereby the image viewed through the viewfinder is always sharp and clear and the precise focusing can be effected for better photography.

The above and other objects, features and advantages of the present invention will become more apparent from the following description of one illustrative embodiment thereof with reference to the accompanying drawings.

DESCRIPTION OF THE PREFERRED EMBODIMENT

Figure 1:
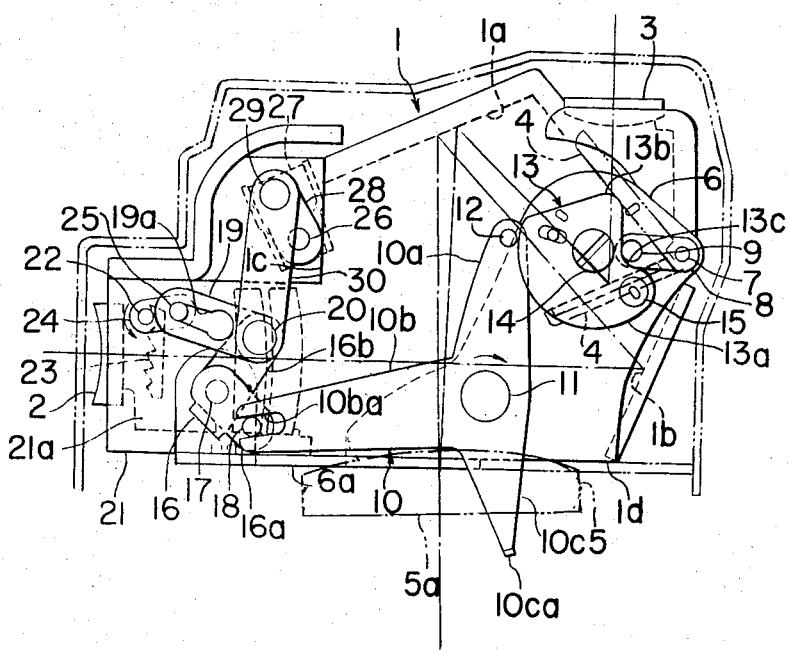
FIG. 1 is a side view of an eye-level and waist-level viewfinder incorporating therein a device of the present invention.
Figure 2:
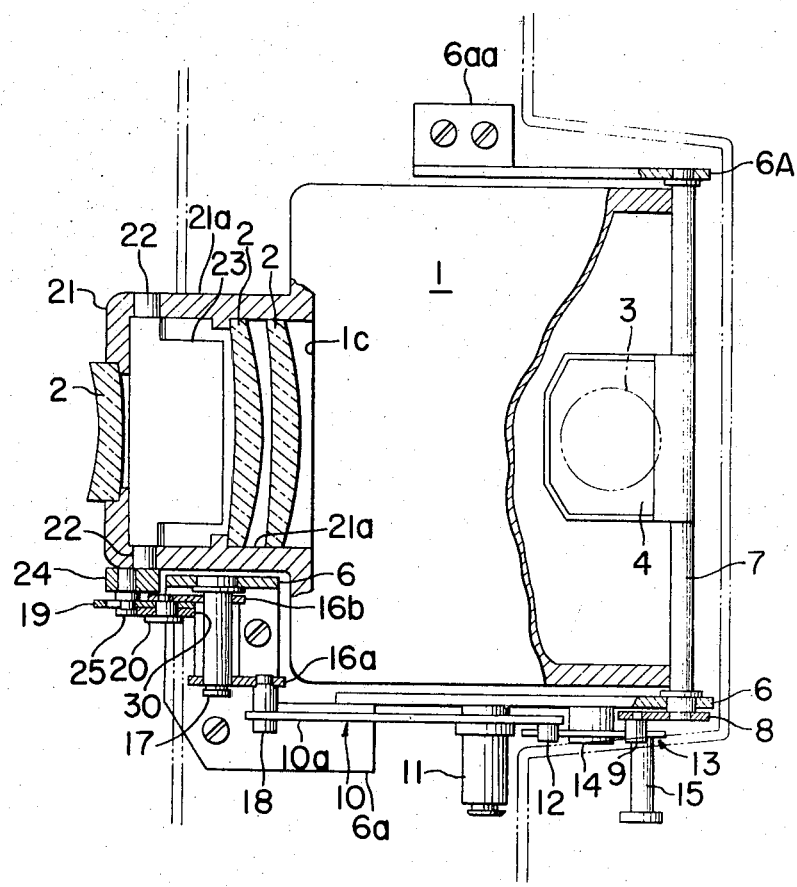
FIG. 2 is a plan view thereof with some parts broken away.

A hollow pentaroof-type reflecting mirror 1 has roof-type reflecting surfaces 1a, a final reflecting mirror 1b, a light entrance 1d and a light exit 1c. An eye-level eyepiece 2 is disposed in the vicinity of the light exit 1c while a waist-level eyepiece 3 is disposed upwardly of the final reflecting mirror or surface 1b. A planar reflecting mirror 4 is rotatably disposed between the waist-level eyepiece 3 and the final reflecting mirror 1b in such a manner by the operation from the exterior of the camera the planar reflecting mirror 4 may be moved into and away from the pentaroof-type reflecting mirror 1 so that the planar reflecting mirror 4 may be selectively positioned at a retracted position (indicated by the two-dot line in FIG. 1) or at a reflecting position (indicated by the dotted line in FIG. 1). When the reflecting mirror 4 is at its retracted position, the light entering into the viewfinder from the focusing plane 5a of the focusing plate 5 reaches the eye-level eyepiece 2 through the roof-type reflecting surface 1a and the final reflecting surface 1b, and the planar reflecting mirror 4 shields the light so as not to allow the light to reach the waist-level eyepiece 3. On the other hand, when the planar reflecting mirror 4 is at its reflecting position, the light entering into the viewfinder reaches the waist-level eyepiece 3 through the roof-type reflecting surface 1a and the planar reflecting mirror 4.

Supporting frames 6 and 6A are secured to the camera through their bases 6a and 6aa respectively and between the frames 6 and 6A is rotatably extended a rotary shaft 7 carrying the reflecting mirror 4. The rotary shaft 7 is normally biased to rotate in the counterclockwise direction in FIG. 1 by a spring not shown. One end of a lever 8 is securely fixed to one end of the rotary shaft 7 while the other end of the lever 8 has a pin 9. The three-arm drive lever 10 is rotatably fixed to the frame 6 through a pin 11 and is normally biased to rotate in the clockwise direction in FIG. 1 by a spring not shown. At the leading end of one arm 10a of the drive lever 10 is extended a pin 12 while the leading end portion of the second arm 10b is bifurcated as shown by 10ba. The leading end of the third arm 10c is bent as shown by 10ca. A cam 13 having a high stepped portion 13a, a middle stepped portion 13b and a low stepped portion 13c is rotatably fixed to the frame 6 through a pin 14 and is rotated by a knob 15 operable from the exterior of the camera. The pin 9 of the lever 8 and the pin 12 of the drive lever 10 are normally engaged with the cam 13. When the pin 9 of the lever 8 is in engagement with the lower stepped portion 13c of the cam 13, that is when the planar reflecting mirror 4 is at its reflecting position, the pin 12 of the drive lever 10 engages with the higher stepped portion 13a of the cam 13. On the other hand, when the pin 9 engages with the higher stepped portion 13a, that is when the reflecting mirror 4 is at its retracted position, the pin 12 may engage with both of the middle and low stepped portions 13b and 13c. The above described three engagement positions may be obtained by rotating the cam 13 through a predetermined angle through the knob 15.

A two-arm intermediate lever 16 is rotatably fixed to the frame 6 through a pin 17. A pin 18 is extending from the free end of the one arm 16a and is in engagement with the bifurcated portion 10ba of the drive lever 10. The free end of the other arm 16b is pivotally fixed to a first connecting lever 19 through a pin 20. The first connecting lever 19 has an elongated slot 19a. Rotary shafts 22 are rotatably extended through the sidewalls 21a of the eye-level eyepiece holder 21 and a shielding plate 23 is carried by these shafts 22. One end of a first rocking lever 24 is securely fixed to one shaft 22. Both of the shielding plate 23 and the first rocking lever 24 are normally biased to rotate in the counterclockwise direction by a spring not shown (See FIG. 1). A pin 25 is extending from the other end of the first rocking lever 24 and is in engagement with the elongated slot 19a of the first connecting lever 19. A shaft 26 is rotatably extending through the sidewall 21a and carries a light measuring element 27 and one end of a second rocking lever 28. A second connecting lever 30 is pivotably fixed to the other end of the second rocking lever 28 through a pin 29 and to the arm 16b of the intermediate lever 16 through the pin 20, thereby forming a linkage. When the pin 9 of the lever 8 is in engagement with the lower stepped portion 13c of the cam 13 and the pin 12 of the drive lever 10 engages with the higher stepped portion 13a, the movement of the shielding plate 23 is restricted by the first connecting lever 19 through the first rocking lever 24 so that the shielding plate 23 is restricted by the first connecting lever 19 through the first rocking lever 24 so that the shielding plate 23 is located at its shielding position indicated by the broken line in FIG. 1, thereby shielding the eye-level eyepiece 2. Concurrently, the photometric element 27 is located at its light-measuring position indicated by the broken line in FIG. 1) viewing the focusing plane 5a of the focusing plate 5. When the pin 9 is in engagement with the higher stepped portion 13a while the pin 12 with the middle stepped portion 13b, the first connecting lever 19 is freed relative to the first rocking lever 24 so that the shielding plate 23 is rotated in the counterclockwise direction by the spring, whereby the shielding of the eye-level eyepiece is released. However, the measuring element 27 remains in its partial light measuring position. When the pin 9 is in engagement with the higher stepped portion 13a while the pin 12, with the lower stepped portion 13c, the shielding plate 23 is opened whereas the photometric or light-measuring element 27 is rotated to an average light-measuring position opposed to the final reflecting mirror 1b.

The cam 13 may be rotated by the knob 15 to one of the above described three engagement positions. When the planar reflecting mirror 4 is at its reflecting position, that is when the waist-level eyepiece is used, the shielding plate 23 shields the eye-level eyepiece 2. On the other hand, when the planar reflecting mirror 4 is at its retracted position, that is when the eye-level eyepiece is used, the shielding plate 23 will not shield the eye-level eyepiece 2. It will be clearly understood that when the photometric or light-measuring element 27 is not associated with the device of the present invention, only two of the above-described three engagement positions are required.

It is preferable to employ a click stop for holding the cam 13 in position and to permit the rotation of the cam 13 only in the counterclockwise direction (See FIG. 1).

I claim:

1. A combined eye-level and waist-level viewfinder system in a single-lens reflex camera having a pentaroof-type reflecting mirror body wherein the waist-level eyepiece is positioned upwardly of a final reflecting surface of said body and the eye-level eyepiece is positioned in the vicinity of the light exit of said body comprising
    a first shaft mounted in said camera;
    a planar reflecting mirror mounted on said shaft and pivotal between a retracted position preventing entering light to be reflected through said waist-level eyepiece and a reflecting position allowing entering light to be reflected through said waist-level eyepiece;
    a first lever having one end mounted on said first shaft, and a first pin mounted on the other end of said first shaft;
    a cam rotatably mounted in said camera, said cam having a low stepped portion, a middle stepped portion and a high stepped portion, said cam located and selectively positioned so that said first pin is in contact with one of said portions;
    a shielding plate mounted adjacent said eye-level eyepiece and pivotal to selectively shield said eye-level eyepiece from entering light;
    a second shaft mounted in said camera;
    a drive lever mounted to be selectively rotated on said second shaft, a second pin mounted on one end of said drive lever, said second pin positioned to be in contact with one of said portions of said cam that is different from another of said portions of said cam that is in contact with said first pin;
    a linkage interconnecting another end of said drive lever and said shielding plate;
    a photometric element mounted in said camera and pivotal between a first position wherein a specific area photometric value is viewed and a second position wherein an entire area photometric value is viewed, said photometric element connected to said linkage for its pivotal movement;
    said planar mirror pivotal into said reflecting position wherein said cam is positionable with said first pin in contact with said low stepped portion and said second pin is in contact with said high stepped portion whereby said drive lever positions said linkage and connected shielding plate to shield said eye-level eyepiece and locate said photometric element in its first position;
    said planar mirror pivotal into said retracted position wherein said cam is positionable with said first pin in contact with said high stepped portion and said second pin is in contact with said middle stepped portion whereby said drive lever positions said linkage and connected shielding plate to allow entering light to pass through said eye-level eyepiece and locate said photometric element in its first position; and
    said planar mirror pivotal into said retracted position wherein said cam is positionable with said first pin in contact with said high stepped portion and said second pin is in contact with said low stepped portion whereby said drive lever positions said linkage and connected shielding plate to allow entering light to pass through said eye-level eyepiece and pivotally locate said photometric element in its second position.

2. A system according to claim 1 in which said drive lever includes three arms, said second pin is located at the end of one arm, and a second arm has an end shaped as a bifurcated slot, a third pin is associated with said linkage and positioned to be slidably engaged within said slot.

3. A system according to claim 2 in which said linkage includes a two-armed intermediate lever mounted to rotate in said camera, one end of said intermediate lever is operatively associated with said third pin and its other end includes an operative connection to said photometric element to provide its pivotal movement.

4. A system according to claim 3 in which a first connecting lever is provided having one end connected to said other end of said intermediate lever and including a slotted area therein, a fourth pin is provided that is operatively connected with said shielding plate and mounted in said slotted area to provide the pivotal movement of said shielding plate.

5. A system according to claim 3 in which a second connecting lever is provided having one end connected to said other end of said intermediate lever and its other end provides the connection to said photometric element for the pivotal movement.

* * * * *